(12) United States Patent
Sekizawa et al.

(10) Patent No.: US 7,554,695 B2
(45) Date of Patent: Jun. 30, 2009

(54) APPARATUS AND METHOD FOR IMAGE FORMING

(75) Inventors: Hidekazu Sekizawa, Kanagawa-Ken (JP); Kunihiko Miura, Kanagawa-Ken (JP); Hirokazu Shoda, Kanagawa-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 616 days.

(21) Appl. No.: 11/260,309

(22) Filed: Oct. 28, 2005

(65) Prior Publication Data
US 2006/0209356 A1    Sep. 21, 2006

(30) Foreign Application Priority Data
Mar. 18, 2005    (JP)    ............................. 2005-079867

(51) Int. Cl.
*H04N 1/40* (2006.01)
(52) U.S. Cl. ....................................... 358/2.1; 358/448
(58) Field of Classification Search .................. 358/1.9, 358/2.1, 1.15, 448–461; 382/273–275
See application file for complete search history.

(56) References Cited

U.S. PATENT DOCUMENTS
4,937,682 A * 6/1990 Dalton ........................ 358/461

FOREIGN PATENT DOCUMENTS
JP    2004-78652 A    3/2004
JP    2004-280603 A    10/2004

* cited by examiner

*Primary Examiner*—Thomas D Lee
*Assistant Examiner*—Stephen M Brinich
(74) *Attorney, Agent, or Firm*—Foley & Lardner LLP

(57) ABSTRACT

An image forming apparatus according to an embodiment of the invention includes: a scanner that reads an original document; an image processor that processes a high-lightness region of the original document, the region is lighter than the base of the original document, so as to be viewed; and an output unit that outputs the data of the original document subjected to image processing.

16 Claims, 5 Drawing Sheets

APPARATUS AND METHOD FOR IMAGE FORMING

BACKGROUND OF THE INVENTION

1. Field of the Invention

The present invention relates to an apparatus and a method for image forming, and in particular, it relates to an apparatus and a method for image forming that store and print or display input documents or images.

2. Description of the Related Art

It has become common practice for companies to make documents printed on paper or the like into electronic form to challenge the information sharing and to solve the problem of storage space.

Digitalizing an enormous volume of print documents and storage them in specific in-company servers etc. allow information sharing and easy accesses to the electronic information as needs arise. Also, digitalizes documents can be freely output in the form of hard copy, so that there is no need to store original print documents, contributing to the reduction of storage space.

However, all documents are not always digitalizes in practice. For example, it is still general to store what-is-called original copies of tax documents, financial statements, etc. (hereinafter, referred to as tax/finance-related documents) in the form of paper without being digitalizes in companies or the like.

This is because there is a legal limitation, and, from a technical point of view, there is no sufficient technique to read the only one original copy with higher reproducibility than for general documents, and print the read electronic information with high reproducibility.

A more important point is that, for image forming apparatus including scanners, a technique of data security, such as confidentiality and prevention of tampering, has not yet been developed and applied sufficiently.

However, in recent years, the technique of high-resolution and high-color-reproducibility of image forming apparatus such as scanners has made remarkable progress, and a security technique for improving confidentiality and preventing tampering has also made great advance. From a technical viewpoint, this has decreased the necessity of storing original paper copies by digitalizing the originals of tax/finance-related documents and storing and managing them as electronic originals.

In response to the progress of the techniques, there is a legal tendency to approve electronic documents of part of tax/finance-related documents as electronic originals.

To digitalize paper originals to generate electronic originals, it is important to develop not only a technique of preventing tampering of electronic originals but also a technique of preventing tampering of paper originals in advance.

One of the techniques of preventing the tampering of paper documents is a technique of applying a special pattern on the base of the original to distinguish the original from copies. The effect of the pattern is increasing the visibility of specific concealed characters in the copies, which are inconspicuous in the original with naked eyes. The techniques distinguish the original from copies using this effect.

There is also an application of this concept; a technique of printing a pattern with a printer. For example, JP-A 2004-280603 discloses a technique of printing a pattern so as to cover addresses, names, etc. when printing public documents such as a resident's card, whereby, when they are copied, making specific characters come to the front.

The digitalization of documents such as tax/finance-related documents requires a technique with higher data security and higher reproducibility than for general documents.

Specifically speaking, the digitalization of tax/finance-related documents requires the function of reading paper originals before digitalizing so as to check for tampering with white-out, and displaying the corrected marks on a display or printing it with a printer so that it can easily be identified.

When corrected marks can be viewed in the image forming apparatus, tampering to the original can be prevented and generation of an electronic original based on the tampered document can be prevented.

The white of white-out is generally whiter (lighter) than that of the base of documents (the color of paper). This requires the function of reading also the white of high-lightness of white-out etc.

On the other hand, the technique of reading and digitalizing general documents has the function of reading the documents such that the white of the base of the documents (the color of the documents) become inconspicuous to prevent the white of the base from looking like a stain.

Specifically speaking, a saturation characteristic is provided by setting the gradation characteristic of scanners appropriately, the saturation characteristic preventing the white lighter than the base of a document from becoming lighter than the base of the document. Thus, the white of the base of the document can be as light as that of the print paper. This process (hereinafter, referred to as "general base processing") prevents the white of the base of the document from coming to the front of the print document, providing a clear print document.

The "general base processing" adopts the process of saturating lightness higher than that of the white of the base of documents. Accordingly, information on high-lightness white such as white-out is lost during reading, and so cannot be read.

Thus "special base processing" is required which does not saturate even lightness higher than that of the white of the base.

Furthermore, even after reading a document without saturating high-lightness white of white-out etc., the corrected marks with the white-out sometimes disappear depending on subsequent image processing, particularly, density conversion processing. For example, when the density (lightness) of the corrected marks is set higher than the white of print paper, the white is saturated by the white of the print paper, so that the corrected marks disappear. The white of corrected marks can be made conspicuous by decreasing (darkening) the entire density. In this case, however, the part other than the corrected marks also becomes dark throughout, resulting in illegible print output.

Accordingly, image processing that increases the contrast of corrected marks locally is required.

Even if image data that is read without saturation of corrected marks can be generated, the corrected marks can be removed in principle through intended tampering on the image data, for example, intended alteration of gradation processing during the generation. Thus a system of preventing intended correction or removal of the read corrected marks is also required.

SUMMARY OF THE INVENTION

The present invention has been made in view of the above-described circumstances. Accordingly, it is an object of the invention to provide an apparatus and method for image forming capable of generating image data in such a manner that corrected marks with white-out etc. on an original document can easily be viewed, and preventing intended tampering to the image data to erase the corrected marks.

An image forming apparatus according to an aspect of the invention includes: a scanner that reads an original document; an image processor that processes a high-lightness region of the original document, the region is lighter than the base of the original document, so as to be viewed; and an output unit that outputs the image data of the original document subjected to image processing.

An image forming method according to a second aspect of the invention includes the steps of: reading an original document; image-processing a high-lightness region of the original document, the region is lighter than the base of the original document, so as to be viewed; and outputting the image data of the original document subjected to image processing.

The apparatus and method of image forming according to an embodiment of the invention can generate image data in such a manner that corrected marks with white-out etc. applied on an original document can easily be viewed, and can prevent intended tampering to the image data to erase the corrected marks.

DESCRIPTION OF THE PREFERRED EMBODIMENT

An image forming apparatus and method according to an embodiment of the invention will be described with reference to the accompanying drawings.

1. Overall Structure of Image Forming Apparatus

Figure 1:
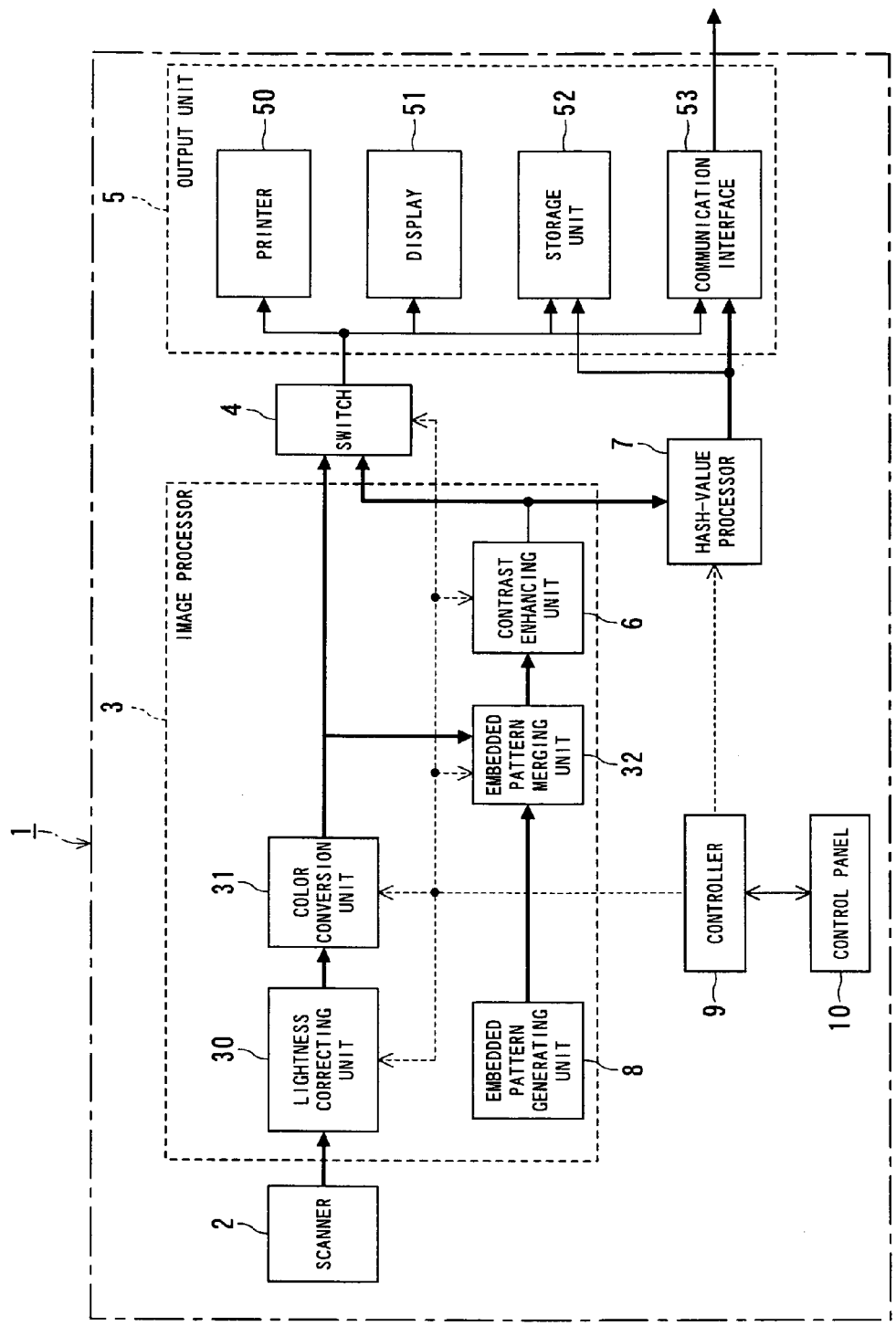
FIG. 1 is a block diagram of an image forming apparatus according to an embodiment of the invention.

FIG. 1 shows the structure of an image forming apparatus 1 according to an embodiment of the invention.

The image forming apparatus 1 includes a scanner 2 that reads original documents; an image processor 3 that processes corrected marks (a high-lightness region) contained in an original document and lighter than the base of the original document into visible marks and; an output unit 5 that outputs the processed image data of the original document.

The image forming apparatus 1 includes: a hash-value processor 7 that calculates a hash value from the image data output from the image processor 3 and adds the calculated hash value to the image data to generate hash-value-added image data; a controller 9 that controls the entire image forming apparatus 1; and a control panel 10 for a user to execute various operations and having various display functions.

The image processor 3 includes: a lightness correcting unit 30 that corrects the lightness of image data read by the scanner 2; a color conversion unit 31 that converts the RGB signals of the light-corrected image data to signals of another color space such as CMYK; an embedded-pattern generating unit 8 that generates a specific repetitive pattern called an embedded-pattern and outputs it to the image processor 3; and an embedded-pattern merging unit 32 that superimposes the embedded-pattern generated by the embedded-pattern generating unit 8 on the image data. When the signals are output to a printer 50 of the output unit 5, the color conversion unit 31 converts the RGB signals to ink signals for printer recording such as CMYK; when output to a display 51 or to the outside via a communication interface 53, it converts to standard color space such as sRGB color space.

The image processor 3 further includes a contrast enhancing unit 6 that enhances the contrast of local area for color-converted image data or image data to which an embedded-pattern is merged.

The image forming apparatus 1 further includes a switch 4 that switches normally processed image data and contrast-enhanced image data.

The output unit 5 includes: the printer 50; the display 51; a storage unit 52; and the communication interface 53. The output unit 5 has not necessarily to have all the components but may have one or any of the components.

2. Outline of the Operation of Image Forming Apparatus

The outline of the entire operation of the image forming apparatus 1 with such a structure will now be described.

The image forming apparatus 1 roughly has two operation modes, "a normal model" and "a special mode".

The "normal mode" indicates an operation mode in which general documents containing characters and pictures are operated. In the "normal mode", a general document is read by the scanner 2, and it is subjected to standard image processing by the image processor 3, and is then output to, for example, the printer 50 of the output unit 5 to generate the copy of the general document. In this case, the image forming apparatus 1 works as a standard copying machine. To output the image data of the read general document to an external personal computer or the like via the communication interface 53, the image forming apparatus 1 also works as a standard scanner.

In contrast, the "special mode" indicates an operation mode in which tax/finance-related documents, e.g., special documents such as receipts, are managed with high security. This is for reading the paper original of tax/finance-related documents with the scanner 2 and generating an electronic original on the basis of the read image data.

The "normal mode" and the "special mode" can be switched by a user with a switch provided to the control panel 10. Alternatively, after a read document has been differentiated, the "normal mode" and the "special mode" may be switched automatically, depending on the kind and content of the document.

When digitalizes original data created in the "special mode" is sent to the outside via the communication interface 53 and then recognized by another image forming apparatus, the digitalizes original data can be directly input to the contrast enhancing unit 6 via an interface (not shown), where the digitalizes original data is subjected to contrast enhancement, and it can be viewed on the display 51. In this case, a code indicative of that the digitalized original data is generated in the "special mode" may be added to the header of the data so that the fact that the data is generated in the "special mode" can be known.

The image forming apparatus 1 according to the embodiment can execute various functions different from that of the "normal mode" to ensure high security when switched to the "special mode". Accordingly, when switched to the "special mode", the image forming apparatus 1 makes the components such as the image processor 3 and the switch 4 execute processes corresponding to the "special mode" by setting various control signals and specified parameters from the controller 9.

One of the security functions of the image forming apparatus 1 provided by the "special mode" is to generate image data that can be easily viewed whether or not the original of read tax/finance-related documents is tampered with white-out or the like. For image data processed in the "normal mode", the marks of white-out etc. lighter than the base of the original of tax/finance-related documents cannot be viewed. In the "special mode", the corrected marks are processed so as to be conspicuous.

Another security function of the "special mode" of the image forming apparatus 1 is to prevent electronic tampering to image data. Even when image data whose corrected marks have high visibility can be generated, the corrected marks can be erased again by electronic tampering in principle if unprocessed. The "special mode" therefore further provides a function of preventing electronic tampering to image data.

3. Details of the Operation of Image Forming Apparatus

The operation of the security function when the image forming apparatus 1 is set in the "special mode" will be principally described.

The structure and operation of the scanner 2 are not greatly different between the "normal mode" and the "special mode". The scanner 2 includes: for example, a light source that emits light to be applied to a document (original document); a CCD sensor that converts reflection light from the document to an electric signal; an optical system that guides the reflection light from the document to the CCD sensor; and a driving system that moves the light source mechanically. The signal from the CCD sensor is converted from analog to digital form and is then output to the image processor 3.

4. Correction of Lightness (Shading Correction)

The signal input to the image processor 3 is first corrected in lightness by the lightness correcting unit 30. The lightness correction is also referred to as shading correction. First correction for the shading correction is to correct lightness so that the distribution of lightness in the main scanning direction becomes even. The light source of the scanner 2 is in the form of a column, so that the distribution of light along the axis of the column (in the main scanning direction) is not always even. The lightness correcting unit 30 therefore corrects the lightness so that the lightness in the main scanning direction becomes even, according to the lightness of reflection light from a reference white plate of the scanner 2.

Second correction for the shading correction is to prevent the white of the base of a document from becoming conspicuous as a stain (gray color) when printed on output paper. To this end, in the "normal mode", the shading correction corrects a gradation characteristic to provide a saturation characteristic for lightness more than a specified lightness.

The second correction is important for the "normal mode" to provide beautiful printing. However, this makes also corrected marks with white-out or the like that are lighter than the white of the base inconspicuous. This is because the corrected marks themselves disappear by the gradation correction having a saturation characteristic.

Thus, for the "special mode", the second correction of the shading correction has another correction process.

Specifically, an image signal s(i) from the CCD sensor is subjected to lightness correction by eq. (1) to obtain a corrected image signal S(i).

Expression 1

$$S(i)=(s(i)-B(i))/(W(i)-B(i))\times D\times K \qquad \text{Eq.(1)}$$

where i is an index indicative of the $i^{th}$ pixel signal of the CCD sensor; W(i) is the white level of the reference white plate; B(i) is the black level (in general, the input level when the light source is in off mode); s(i) is an input from the CCD sensor; S(i) is an output after correction; D is a dynamic range (e.g., 4096 for 12-bit width); and K is a correction coefficient.

In eq. (1), K is set to be K=1 in the "normal mode". The white level of the reference white plate is equal to or lighter than the white of the base of a general document. Thus corrected marks lighter than the white of the base of the document or the white of the reference white plate exceeds the dynamic range D, resulting in being saturated.

In contrast, for the "special mode", the value K is set lower than 1, e.g., 0.7. As a result, even corrected marks lighter than the white of the base of the document or the white of the reference white plate are not saturated, falling within the dynamic range D.

5. Contrast Enhancing Process

Even if the high-lightness corrected marks are not saturated to fall within the dynamic range D, the process of enhancing the contrast between the white of the corrected marks and the white of the base is needed to increase the visibility of light corrected marks.

For the process of enhancing the contrast, in general, a density conversion characteristic or gamma characteristic has been adjusted by the color conversion unit 31. However, these processes are for enhancing the contrast of the entire image, and so cannot enhance only the contrast of local corrected marks. This results in generating an entirely dark image, or a low-visibility image.

Accordingly, the image forming apparatus 1 according to the embodiment allows enhancing the contrast of local area, not enhancing the contrast of an entire image.

Figure 2:
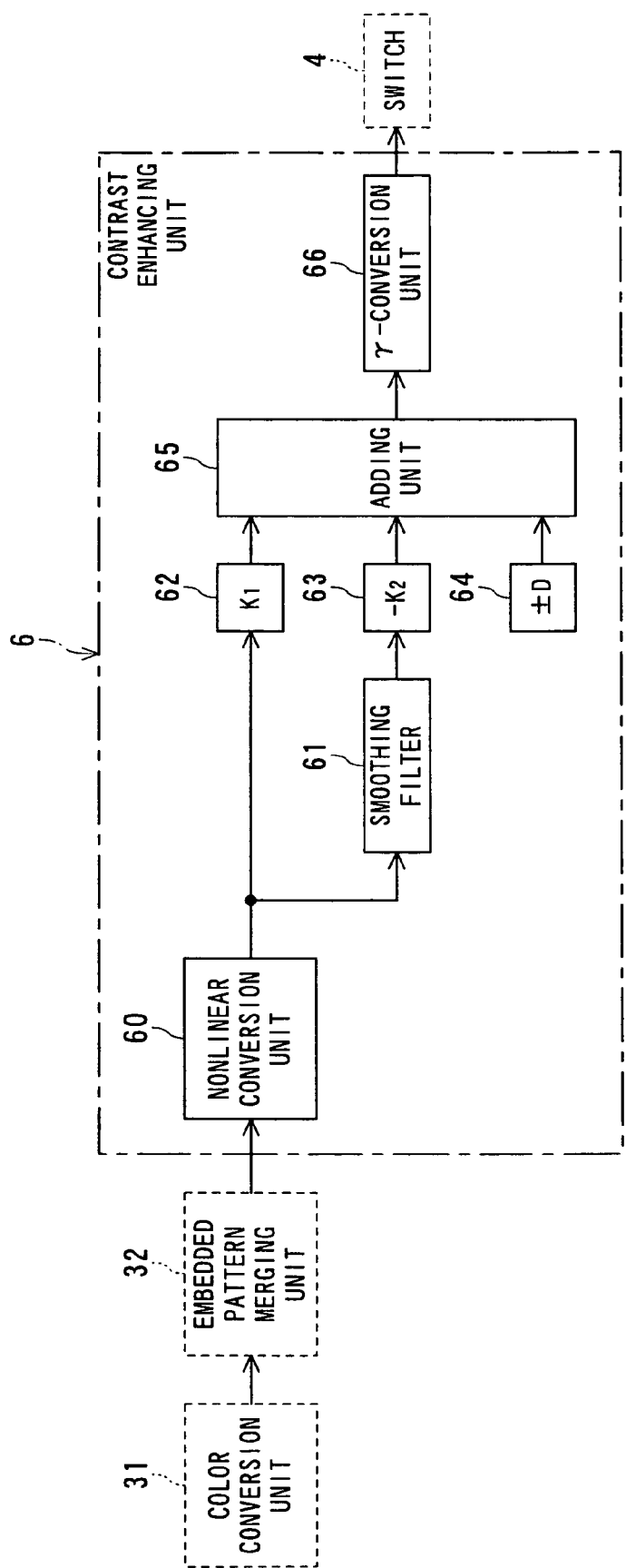
FIG. 2 is a block diagram of a contrast enhancing unit of the image forming apparatus according to the embodiment.

FIG. 2 shows the detailed structure of the contrast enhancing unit 6 of the image forming apparatus 1. The contrast enhancing unit 6 includes a nonlinear conversion unit 60; a smoothing filter 61; coefficients K1 62, −K2 63, and ±D 64; an adding unit 65; and a γ-conversion unit 66.

Image data from the color conversion unit 31 is input to the nonlinear conversion unit 60 of the contrast enhancing unit 6 via the embedded-pattern merging unit 32. The nonlinear conversion is close to density linear conversion and lightness linear conversion, which have a substantially similar gamma characteristic. When the color conversion unit 31 executes conversion processing including the nonlinear conversion, the nonlinear conversion unit 60 is not needed.

One of the outputs of the nonlinear conversion unit 60 is input to the smoothing filter 61. The smoothing filter 61 averages pixel signals in a specified range around a target pixel by a specified weight. When the smoothing filter 61 is made of a Gaussian filter, the pixel signals in a specified range are weighted by a Gaussian factor to calculate the mean.

The adding unit 65 adds a signal obtained by multiplication of the input to the smoothing filter 61 by the coefficient K1, a signal obtained by multiplication of the output of the smoothing filter 61 by the coefficient −K2, and the coefficient ±D, and outputs their sum.

The coefficient ±D indicates adding or subtracting a bias value for adjusting the black level.

The smoothing filter 61 smoothes pixels in a specified range and outputs them. The image output from the smoothing filter 61 becomes a blurred image.

The input signal to the smoothing filter 61, that is a signal Sin before contrast enhancement, is expressed as, for example, Sin=a+A, where value "a" indicates a local lightness-variation component, and value "A" indicates the mean of pixel signals in a specified range.

The smoothing filter 61 smoothes the pixel signals in a specified range. Thus the output Sf of the smoothing filter 61 is approximated by Sf=A when value "a" is sufficiently smaller than A.

Assuming that the bias-adjusting value is set to zero (±D=0), for convenience of explanation, the output Sout of the adding unit 65 can be expressed as Sout=K1 Sin–K2Sf=K1 (a+A)–K2A. Setting the coefficients K1 and K2 as appropriate allows enhancement of a local lightness-variation component.

For example, setting K1=2 and K2=1 gives Sout=2a+A. Comparison of the output Sout of the adding unit 65 and the input Sin of the smoothing filter 61 shows that the local lightness-variation component "a" is enhanced to be twice. In short, a local contrast is enhanced.

The numerical examples are for explaining the operational concept of the contrast enhancing process; the lightness (white level) of the output Sout can be set lower than the white level of output paper, depending on the combination of the coefficients K1 and K2.

FIGS. 3A to 4D show the results of reading a locally corrected receipt with white-out by the scanner 2 and enhancing the contrast of the read image data. For comparison, they show both of a receipt that is "subjected" to contrast enhancement processing and a receipt that is "not subjected" to contrast enhancement processing. Both receipts are corrected in lightness not to be saturated by the lightness of the white of the white-out, so that the lightness of the corrected mark falls within the dynamic range.

Figure 3A:
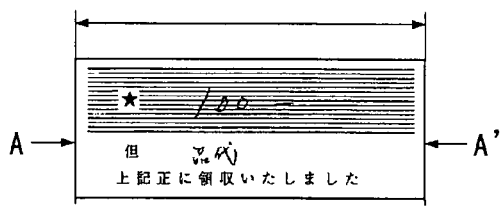
FIG. 3A is a diagram showing image data that is "not subjected" to contrast enhancement processing.

FIG. 3A shows image data that is "not subjected" to contrast enhancement processing. The corrected mark Y (substantially elliptical corrected mark) with white-out cannot be viewed.

Figure 3C:
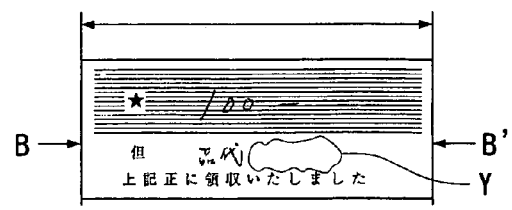
FIG. 3C is a diagram showing image data that is "subjected" to contrast enhancement processing.

In contrast, FIG. 3C shows image data that is "subjected" to contrast enhancement processing. The image data is output in such a form that the corrected mark Y (substantially elliptical mark) with white-out can easily be viewed.

Figure 3B:
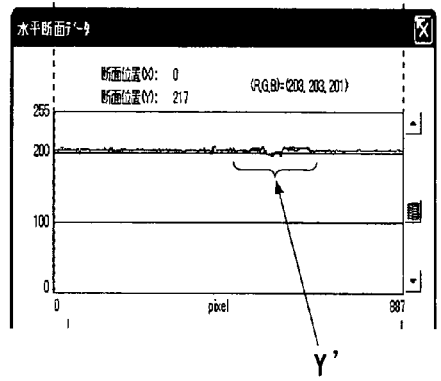
FIG. 3B is a graph showing the intensity of a signal on lateral cross section A-A' of FIG. 3A.

FIG. 3B is a graph showing the intensity of a signal on lateral cross section A-A' of FIG. 3A. The vertical axis of the graph corresponds to the lightness, which increases with increase in value. Approximately "200" corresponds to the mean white level of the base of the receipt. The range Y' indicated by the arrow in the graph of FIG. 3B corresponds to the corrected mark Y. FIG. 3B for the contrast-not-enhanced receipt shows less variation in signal intensity.

Figure 3D:
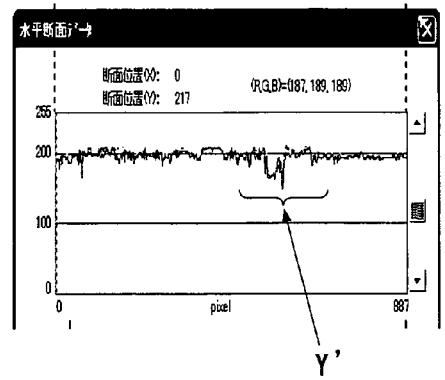
FIG. 3D is a graph showing the intensity of a signal on the cross section B-B' of FIG. 3C.

FIG. 3D is a graph showing the intensity of a signal on the cross section B-B' of FIG. 3C.

FIG. 3D for a contrast-enhanced receipt shows that the variations in signal intensity are enhanced more than those of FIG. 3B.

FIGS. 4A to 4D show the intensity of signals on vertical cross section A-A' and B-B' of the same receipts as those of FIGS. 3A to 3D.

Figure 4A:
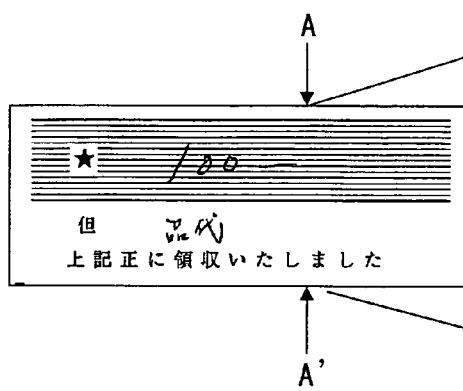
FIG. 4A is a diagram showing image data that is "not subjected" to contrast enhancement processing.

FIG. 4A shows image data that is "not subjected" to contrast enhancement processing. No corrected mark can be viewed.

Figure 4B:
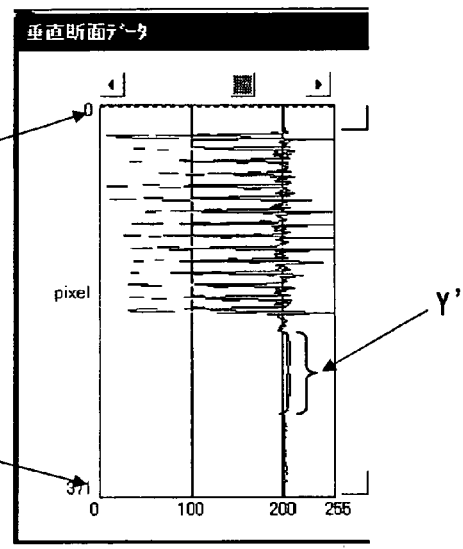
FIG. 4B is a graph showing the intensity of a signal on vertical cross section A-A' of FIG. 4A.
Figure 4C:
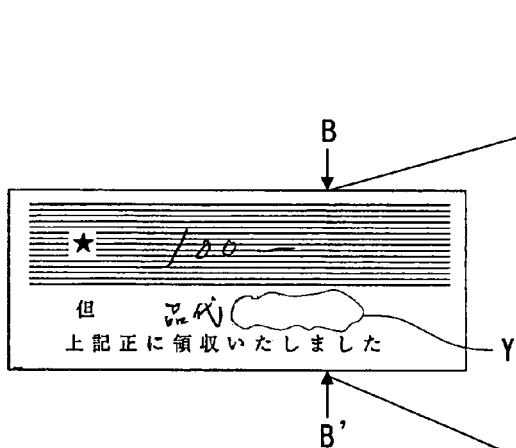
FIG. 4C is a diagram showing image data that is "subjected" to contrast enhancement processing.

In contrast, FIG. 4C shows image data that is "subjected" to contrast enhancement processing, which is the same image data as in FIG. 3A. The corrected marks Y can easily be viewed.

FIG. 4B is a graph showing the intensity of a signal on vertical cross section A-A' of FIG. 4A. The vertical axis of the graph corresponds to the lightness, which increases with increase in value. The position Y' corresponding to the corrected mark Y varies little in signal intensity; as a result, no corrected mark can be viewed in FIG. 4A. The signal intensity varies greatly in the upper half of the graph, which indicates variations in signal intensity corresponding to the stripe pattern of the receipt.

Figure 4D:
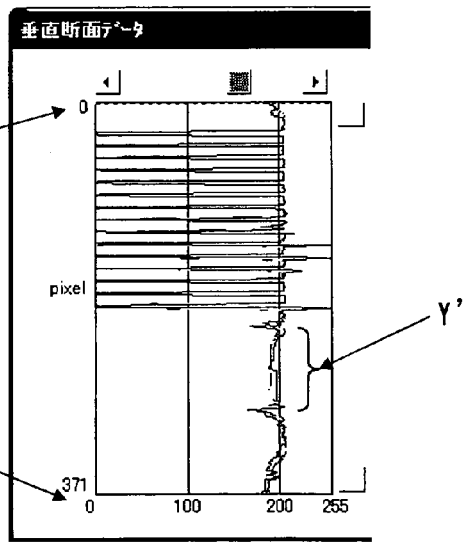
FIG. 4D is a graph showing the intensity of a signal on vertical cross section B-B' of FIG. 4C.

FIG. 4D is a graph showing the intensity of a signal on vertical cross section B-B' of FIG. 4C, which shows that variations in the signal intensity of the part Y' corresponding to the corrected mark Y are enhanced more than those of FIG. 4B by contrast enhancement. Particularly, the signal intensity of the edge of the corrected mark Y is enhanced. As a result, the corrected mark Y can easily be viewed in FIG. 4C.

6. Pattern Merging Process

The lightness correction process (shading correction) and the contrast-enhancing process allow corrected marks to be taken into image data without saturating the lightness of the corrected marks, and the contrast of the corrected marks to be enhanced locally.

However, when the contrast is adjusted in high level by the printer 50 or the display 51 of the output unit 5, the white level of the corrected marks can disappear even in such processed image data. When the contrast is adjusted to high level by the printer 50 or the display 51, it becomes difficult to discriminate whether corrected marks are not present from the beginning or corrected marks have disappeared by adjustment of the contrast.

The image forming apparatus 1 according to the embodiment solves this problem by superimposing an embedded-pattern generated by the embedded-pattern generating unit 8, shown in FIG. 1, on image data.

Specifically, the density of the embedded-pattern to be merged is made lighter than the intensity level of output paper and equal to or slightly lower than that of corrected marks. By setting of the density of the embedded-pattern, the embedded-pattern generally comes to the front by contrast enhancement. If no embedded-pattern comes to the front, this shows that the contrast adjustment (gamma characteristic) of the printer 50 or the display 51 is not proper. Through superimposing of an embedded-pattern on image data, it can be determined whether corrected marks are not present from the beginning or the gamma characteristic for the printer 50 or the display 51 is inappropriate.

The pattern of the embedded pattern is not particularly limited; for example, a regular stripe pattern or dot pattern can be used. The density level of the embedded-pattern is not limited to one, but may be multiple density levels. In this case, the reproduction characteristic of an output unit (the printer 50, the display 51, etc.) can be grasped, depending on what intensity level of the embedded-pattern can be recognized.

7. Hash-Value Processing and Other Processings

Even when image data with high-visibility corrected marks can be generated, for example, in the case of distributing the image data to an external unit via the communication interface 53, tampering is possible in principle which changes the white level of the corrected marks to make the corrected marks invisible using appropriate image-editing software on the external unit.

Thus the image forming apparatus 1 according to the embodiment prevents electronic tampering to image data by hash-value processing of the hash-value processor 7.

Figure 5:
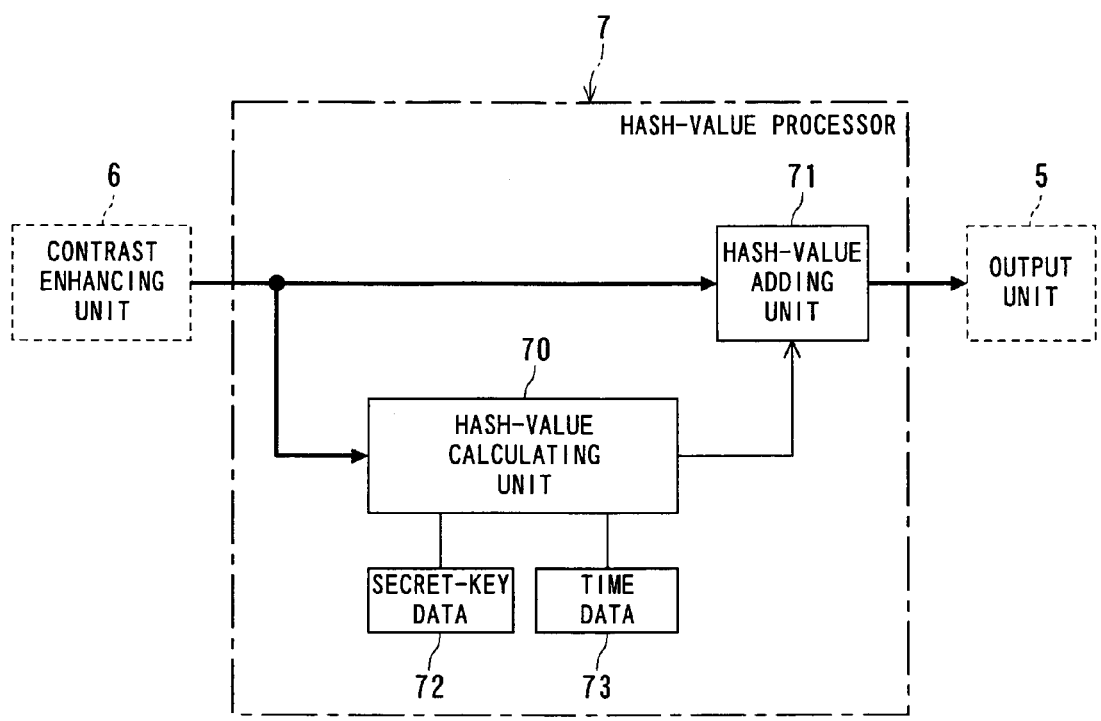
FIG. 5 is a block diagram of a hash-value processor.

FIG. 5 shows the detailed structure of the hash-value processor 7. The hash-value processor 7 includes a hash-value calculating unit 70 and a hash-value adding unit 71.

The hash-value calculating unit 70 adds secret-key data 72 and time data 73 at that time to image data output from the contrast enhancing unit 6 to calculate a keyed hash value using a hash function such as SHA-1.

The calculated hash value is added to the image data by the hash-value adding unit 71. The hash-value-added image data is stored in the storage unit 52 via the switch 4, or alternatively, provided to an external unit via the communication interface 53.

When the image data is tampered, the hash value changes. Accordingly, whether or not the image data has been tampered can be immediately determined by comparison of the hash value of the tampered image data and the hash value added to the image data. Since the hash value added to the image data is encrypted by a secret key, the original hash value can hardly be tampered.

The hash-value processing can prevent tampering to image data. While in the structure of FIGS. 1 and 5, a hash value is calculated for contrast-enhanced image data and the value is then added, image data output from the color conversion unit 31 may be subjected to the hash-value processing.

Tampering to image data can be prevented by the above-described merging of a pattern to image data. With a regular pattern, when image data is tampered, the regularity of part of the pattern will fall into disorder to form a visually different pattern, offering an effect in preventing tampering to image data.

The hash-value calculating unit 70 may calculate the density statistic of image data, such as the total of the densities or the density distributions in place of the hash value, and add the density statistic to the image data in place of the hash value. When image data is tampered, the density statistic changes, so that the added density statistic and that of the tampered image data become different from each other. Accordingly, the comparison of the density statistics allows a determination whether or not the image data is tampered, preventing tampering.

Both of the hash value and the density statistic may be calculated and added to image data.

In addition, tampering to image data can also be prevented by merging what-is-called electronic watermark information into the image data.

As has been described, the image forming apparatus 1 and the image forming method according to the embodiment allow generation of image data such that corrected marks with white-out or the like applied on an original document can easily be viewed, and prevents intended alteration (tampering) to the image data which erases the corrected marks.

It is to be understood that the invention is not limited to the foregoing embodiment and that various modifications may be made in the embodiment by transforming or combining the components in the embodiment, or omitting some of the components from all the components of the embodiment without departing from the spirit and scope thereof.

This application claims priority from Japanese Patent Application 2005-079867, filed Mar. 18, 2005, which is incorporated herein by reference in its entirety.

What is claimed is:

1. An image forming apparatus, comprising:
   a scanner that reads an original document;
   an image processor that processes a high-lightness region of the original document so as to be viewed, the high-lightness region being lighter than a base of the original document; and
   an output unit that outputs the image data of the original document subjected to image processing,
   wherein the image processor includes:
      a lightness correcting unit that corrects the lightness of the image data of the original document read by the scanner by ensuring a wide dynamic range that does not saturate the lightness of the high-lightness region; and
      a contrast enhancing unit that enhances the contrast of a local area of the image data whose lightness has been corrected, and
   wherein the contrast enhancing unit includes a smoothing filter that smoothes a specified area of the lightness-corrected original image data,
   whereby enhancing the contrast of the local area by subtracting a smoothing output that is obtained by multiplying the output of the smoothing filter by a first coefficient from enhanced data that is obtained by multiplying the input of the smoothing filter by a second coefficient.

2. The image forming apparatus according to claim 1, wherein the lightness correcting unit ensures a wide dynamic range by setting a coefficient for shading correction.

3. The image forming apparatus according to claim 1, further comprising:
   an embedded-pattern generating unit that generates a specified embedded-pattern; and
   an embedded-pattern merging unit that merges the generated embedded-pattern to the image data of the original document.

4. The image forming apparatus according to claim 3, wherein
   the density of the embedded-pattern merged by the embedded-pattern merging unit is equal to or lower than the density of the high-lightness region, and equal to or higher than the density of the print paper of a printer of the output unit.

5. The image forming apparatus according to claim 1, further comprising:
   a hash-value calculating unit that calculates the hash value of the image data processed by the image processor; and
   a hash-value adding unit that adds the calculated hash value to the image data to generate hash-value-added image data;
   wherein the output unit outputs the hash-value-added image data.

6. The image forming apparatus according to claim 5, further comprising:
   an embedded-pattern generating unit that generates a specified embedded-pattern; and
   an embedded-pattern merging unit that merges the generated embedded-pattern to the image data of the original document;
   wherein the image data for which the hash value is calculated is image data to which the embedded-pattern is merged.

7. The image forming apparatus according to claim 1, further comprising:
   a density-statistic calculating unit that calculates the density statistic of the image data processed by the image processor; and
   a density-statistic adding unit that adds the calculated density statistic to the image data to generate density-statistic-added image data;

wherein the output unit outputs the density-statistic-added image data.

8. The image forming apparatus according to claim 1, wherein
the output unit includes at least one of a printer that prints the image data; a display that displays the image data; a storage unit that stores the image data; and a communication interface that exchanges the image data with an external unit.

9. An image forming method, comprising the steps of:
reading an original document;
image-processing a high-lightness region of the original document so as to be viewed, the high-lightness region being lighter than a base of the original document; and
outputting the image data of the original document subjected to image processing,
wherein the step of image processing includes the steps of:
correcting the lightness of the image data of the read original document by ensuring a wide dynamic range that does not saturate the lightness of the high-lightness region; and
enhancing the contrast of a local area of the image data whose lightness has been corrected,
wherein the step of enhancing the contrast includes the step of smoothing a specified area of the lightness-corrected original image data,
thereby enhancing the contrast of the local area by subtracting a smoothing output that is obtained by multiplying the output of the smoothing filter by a first coefficient from enhanced data that is obtained by multiplying the input of the smoothing filter by a second coefficient.

10. The image forming method according to claim 9, wherein
the step of correcting the lightness ensures a wide dynamic range by setting a coefficient for shading correction.

11. The image forming method according to claim 9, further comprising the steps of:
generating a specified embedded-pattern; and
merging the generated embedded-pattern to the image data of the original document.

12. The image forming method according to claim 11, wherein
the density of the embedded-pattern merged by the embedded-pattern merging unit is equal to or lower than the density of the high-lightness region, and equal to or higher than the density of the print paper of a printer of the output unit.

13. The image forming method according to claim 9, further comprising the steps of:
calculating the hash value of the image data processed in the step of image processing; and
adding the calculated hash value to the image data to generate hash-value-added image data;
wherein the step of outputting the image data outputs the hash-value-added image data.

14. The image forming method according to claim 13, further comprising the steps of:
generating a specified embedded-pattern; and
merging the generated embedded-pattern to the image data of the original document;
wherein the image data for which the hash value is calculated is image data to which the embedded-pattern is merged.

15. The image forming method according to claim 9, further comprising the steps of:
calculating the density statistic of the image data processed in the step of image processing; and
adding the calculated density statistic to the image data to generate density-statistic-added image data;
wherein the step of outputting the image data outputs the density-statistic-added image data.

16. The image forming method according to claim 9, wherein the step of outputting the image data outputs the image data to at least one of a printer that prints the image data; a display that displays the image data; a storage unit that stores the image data; and a communication interface that exchanges the image data with an external unit.

* * * * *